United States Patent [19]

Eklund et al.

[11] Patent Number: 5,310,975
[45] Date of Patent: May 10, 1994

[54] METHOD AND APPARATUS FOR THE CONTINUOUS FIELD ANNEALING OF AMORPHOUS METAL TRANSFORMER CORES

[75] Inventors: Paul R. Eklund, Hickory, N.C.; George J. Heisler, Meadville, Pa.; Rex E. Koeppen, Buffalo, N.Y.

[73] Assignee: General Electric Company, Schenectady, N.Y.

[21] Appl. No.: 996,131

[22] Filed: Dec. 23, 1992

[51] Int. Cl.$^5$ .............................................. H05B 6/10
[52] U.S. Cl. ...................... 219/635; 219/642; 219/656; 148/570; 266/129
[58] Field of Search ............... 219/10.57, 10.75, 10.71, 219/10.43, 10.69, 10.67, 10.41; 148/567, 570, 571; 266/129

[56] References Cited

U.S. PATENT DOCUMENTS

| | | | |
|---|---|---|---|
| 2,615,119 | 10/1952 | Riegel | 219/10.41 |
| 4,082,936 | 4/1978 | Aoki et al. | 219/10.57 |
| 4,442,332 | 4/1984 | Jackson et al. | 219/10.67 |
| 4,649,248 | 3/1987 | Yamaguchi et al. | 219/10.57 |
| 4,795,870 | 1/1989 | Krumme et al. | 219/10.43 |
| 4,812,608 | 3/1989 | Alexandrov et al. | 219/10.75 |
| 5,023,419 | 6/1991 | Langstedt | 219/10.57 |

*Primary Examiner*—Philip H. Leung
*Attorney, Agent, or Firm*—Bell, Seltzer, Park & Gibson

[57] ABSTRACT

A method and apparatus are disclosed for the continuous annealing of amorphous metal cores of the type used in electrical transformers, and wherein the cores are heated in the presence of a magnetic field. The cores are transported serially along the length of a stationary electrically conductive rod which is located within a furnace, and such that the central openings of the cores face horizontally and the rod passes through the central openings of the advancing cores. Electrical current is caused to flow through a closed loop which includes the rod so as to generate an electromagnetic field along the length of the rod and so that the cores pass through the field while being heated.

25 Claims, 10 Drawing Sheets

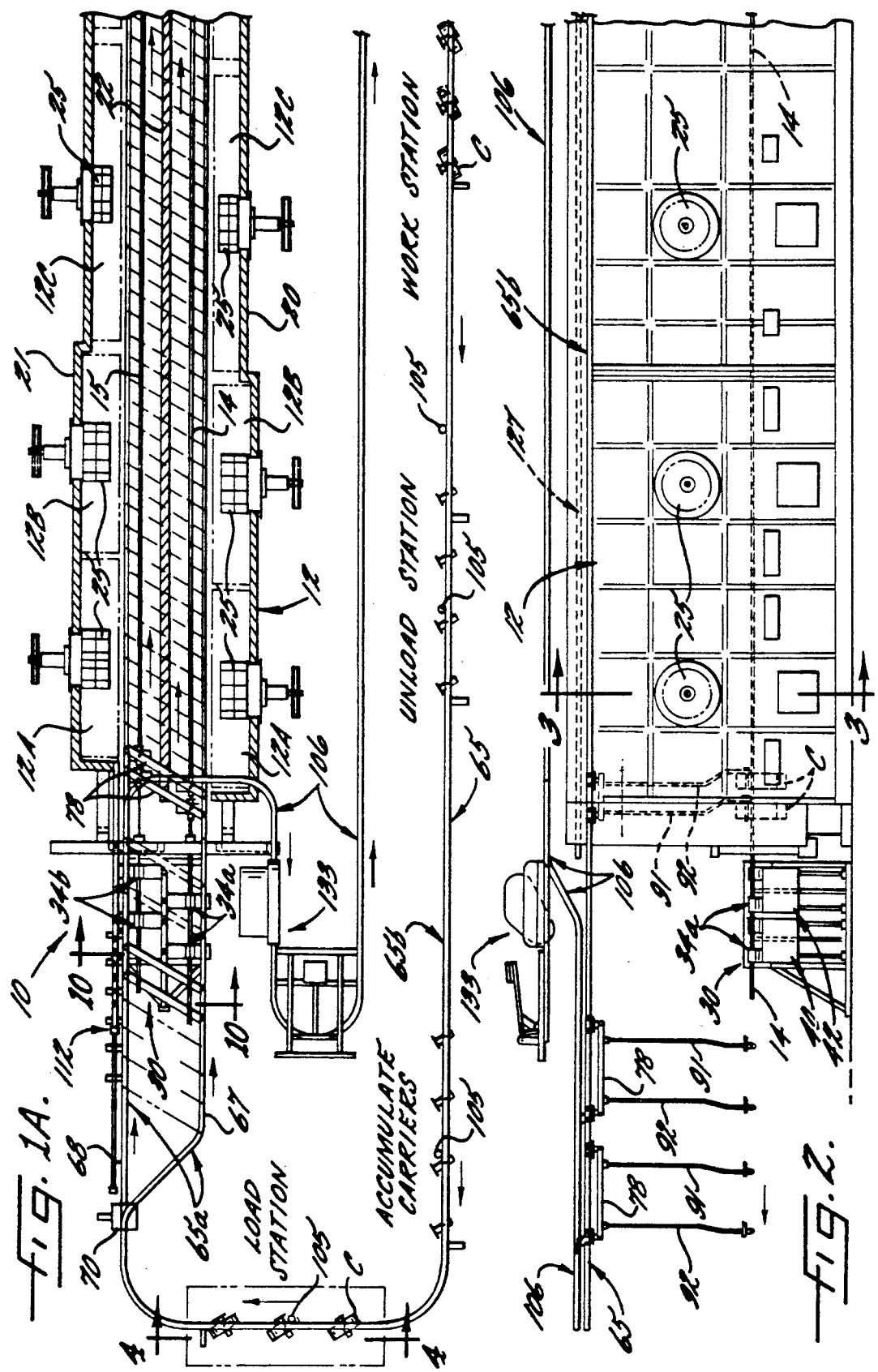

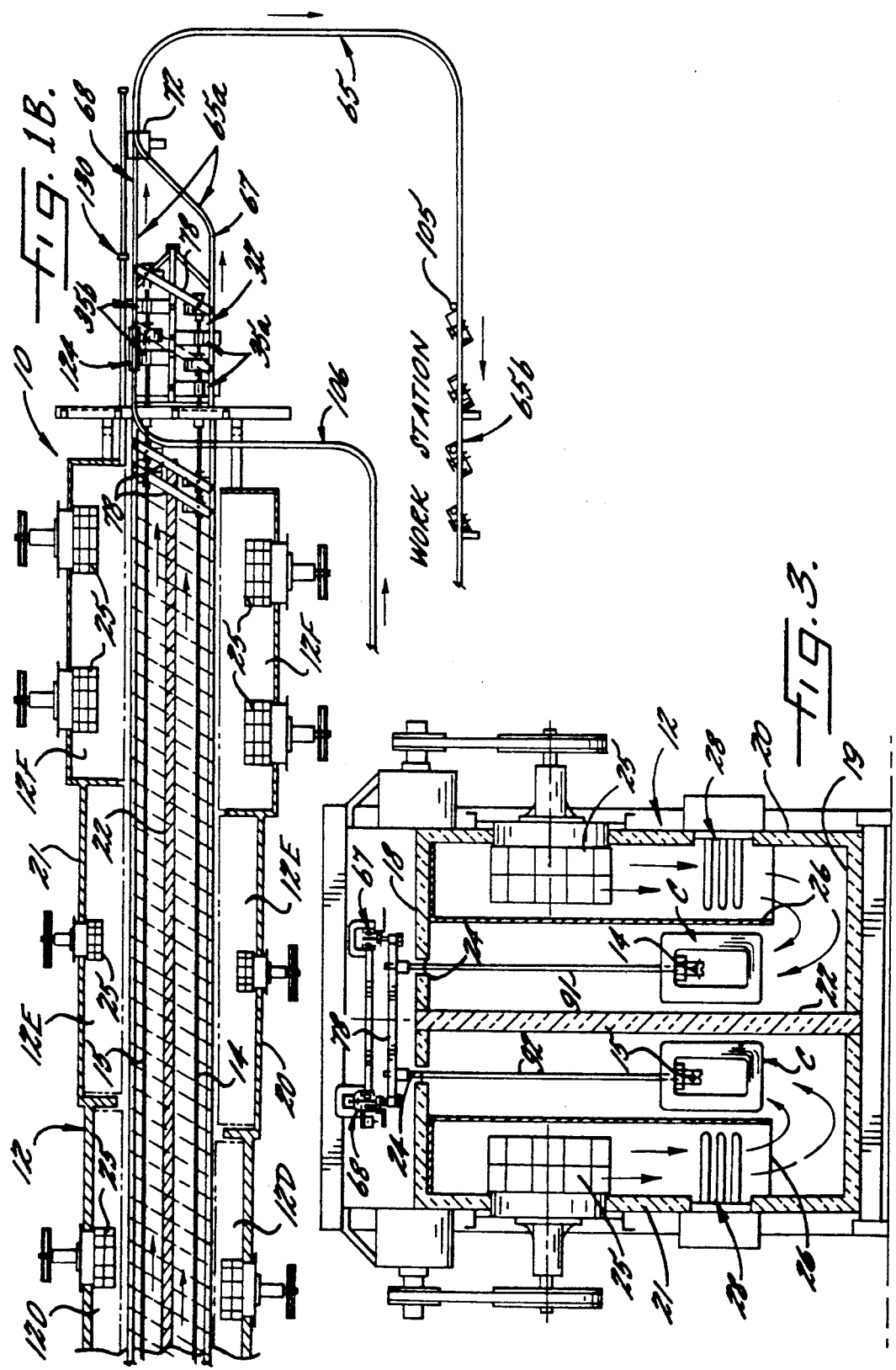

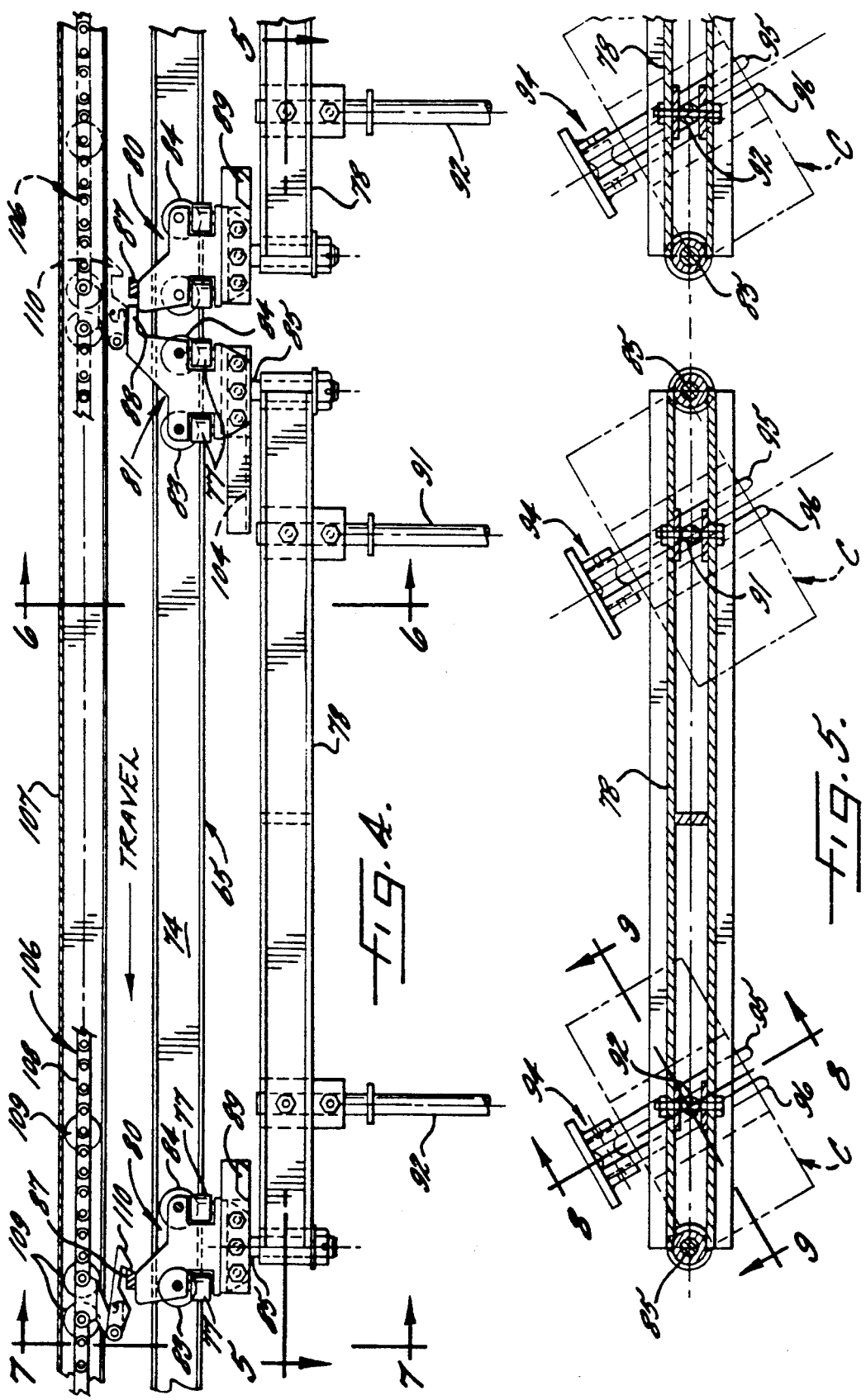

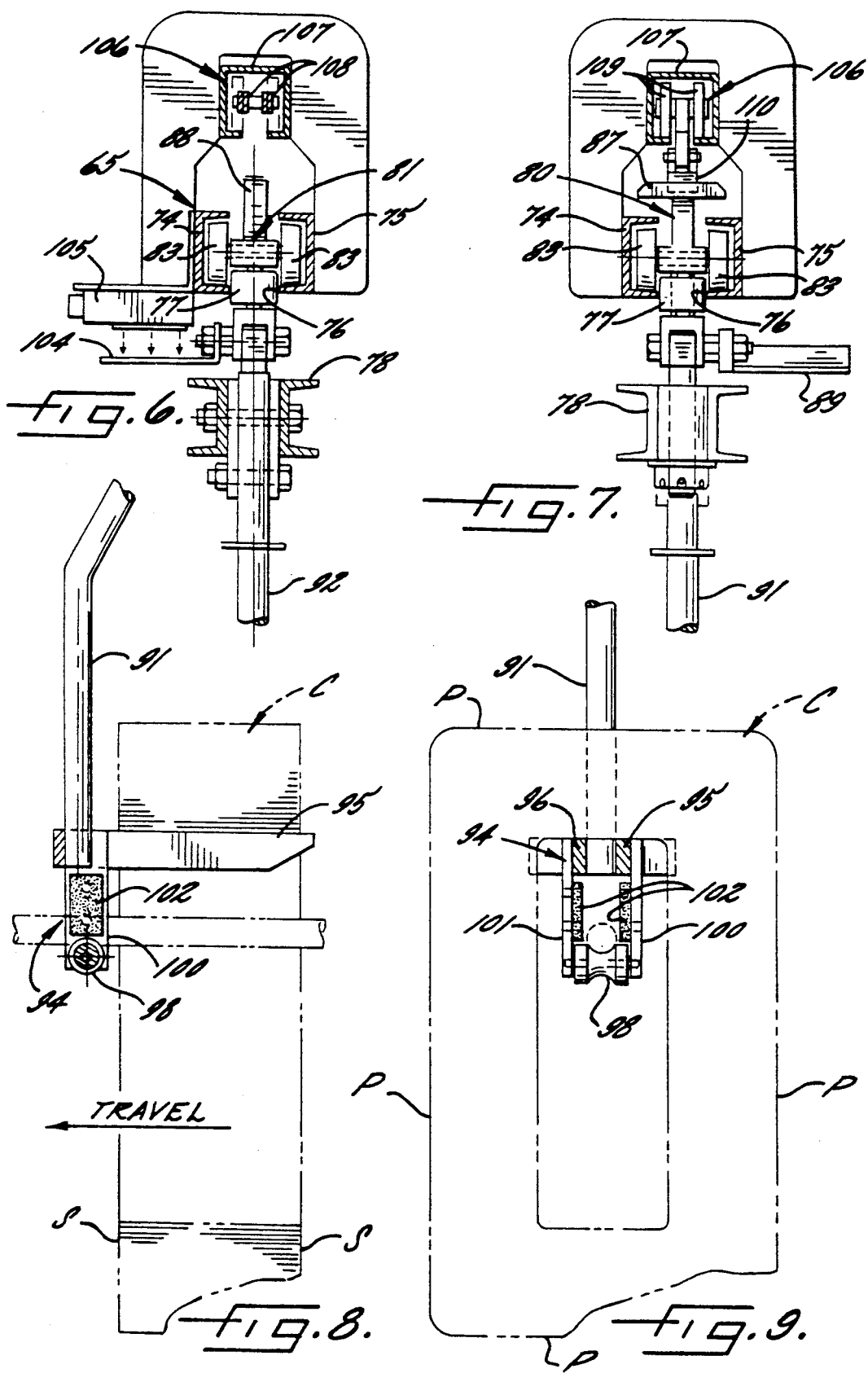

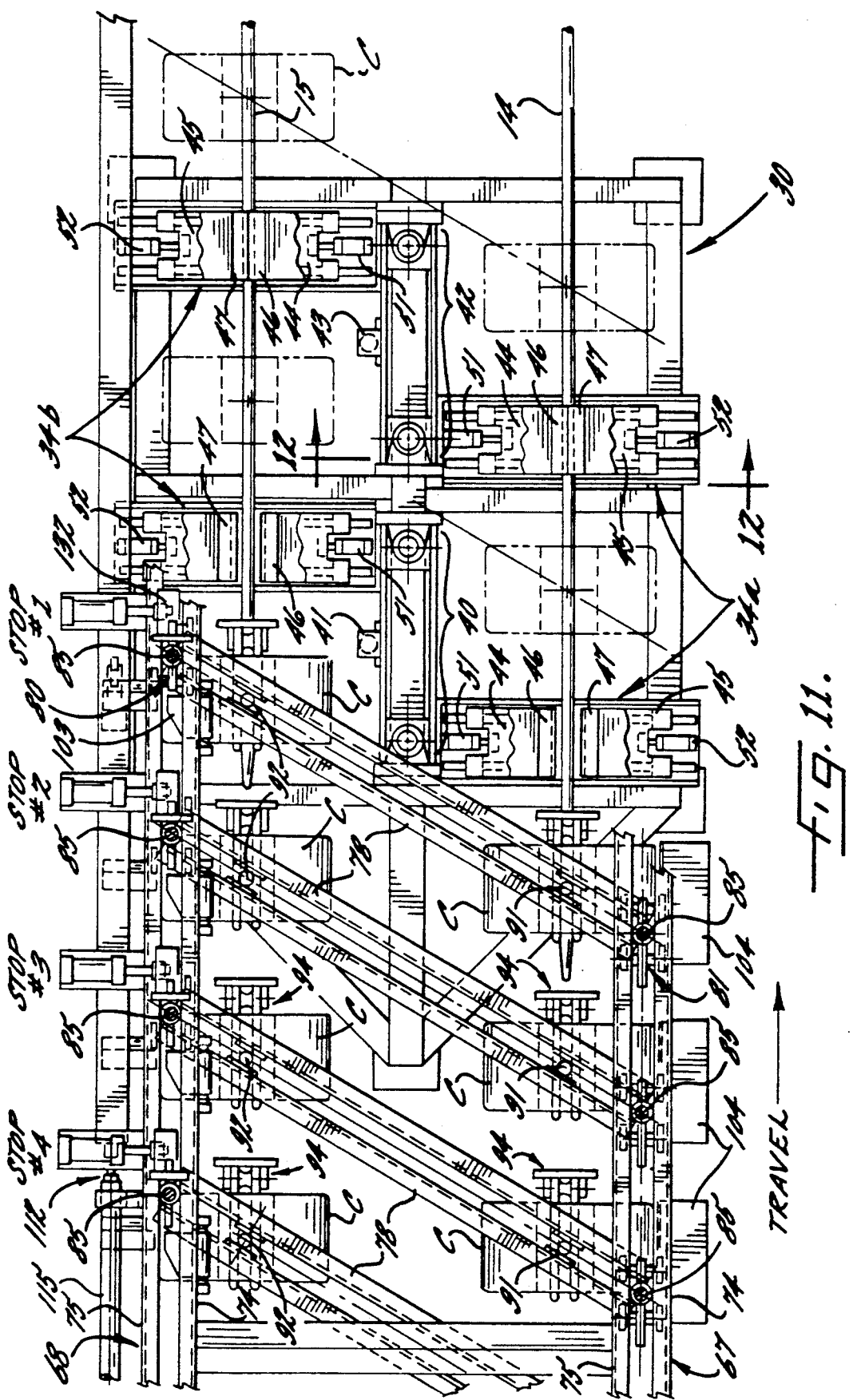

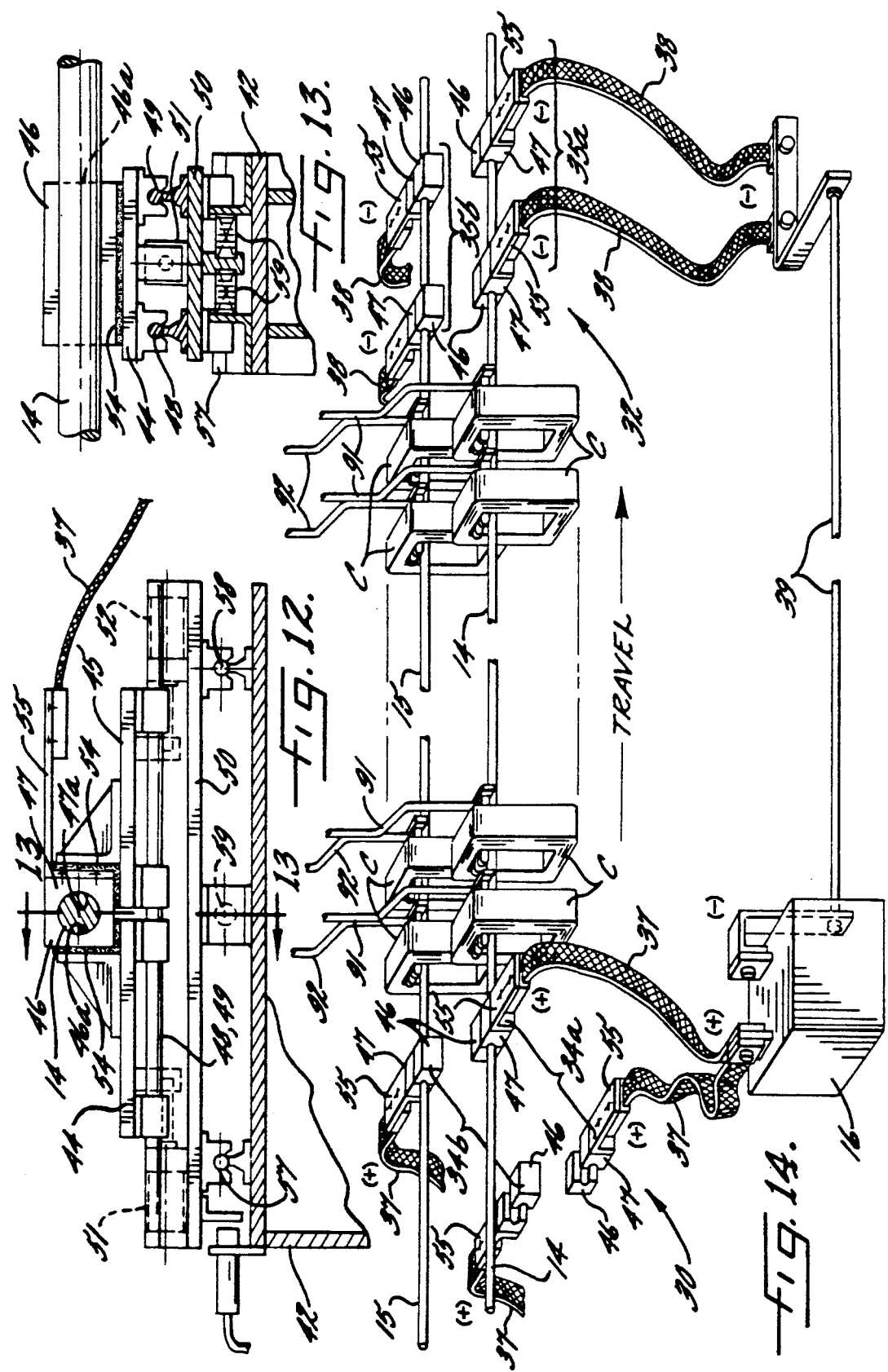

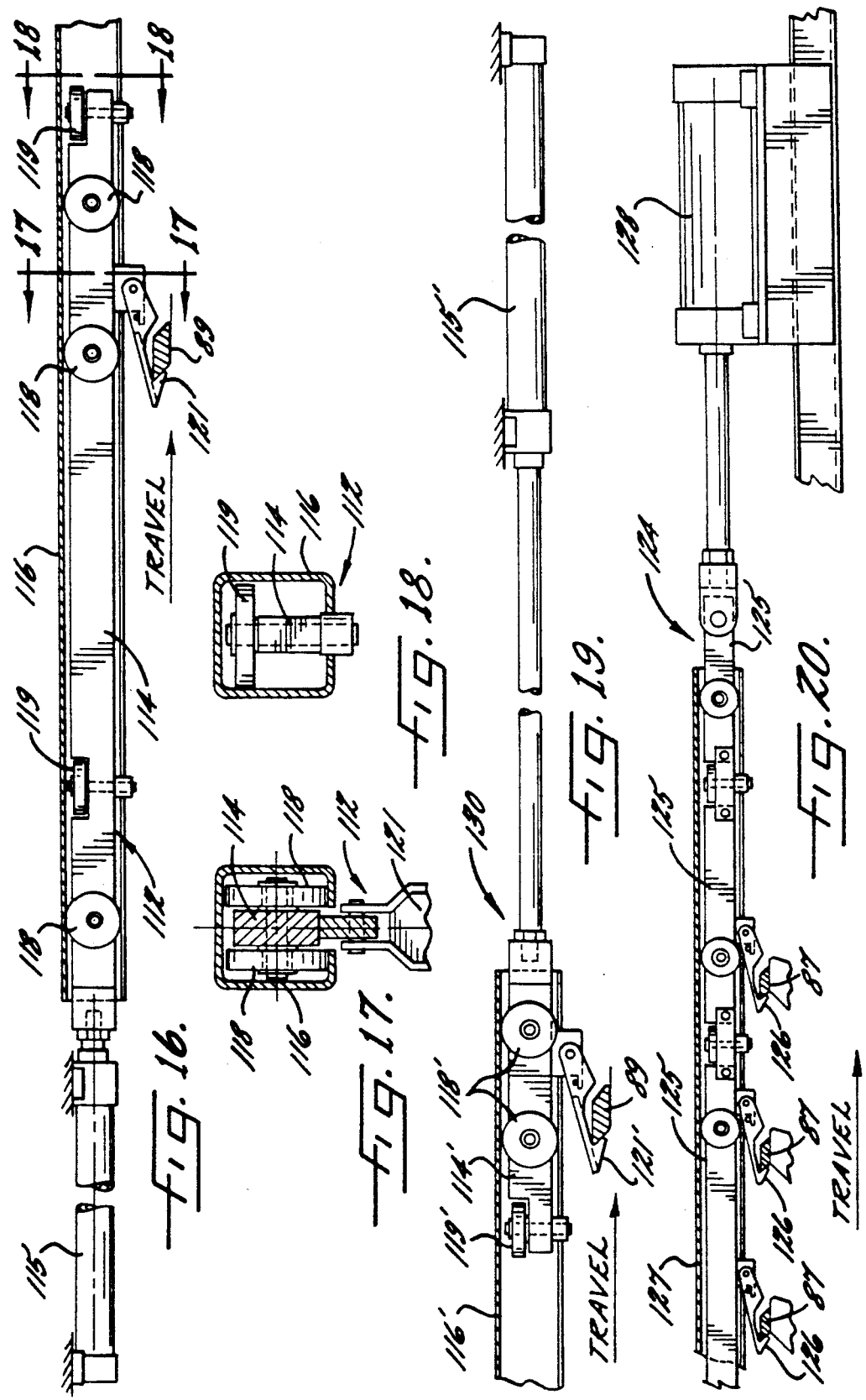

METHOD AND APPARATUS FOR THE CONTINUOUS FIELD ANNEALING OF AMORPHOUS METAL TRANSFORMER CORES

BACKGROUND OF THE INVENTION

The present invention relates to a method and apparatus for annealing closed loop metallic objects in a magnetic field, and more particularly the invention concerns a furnace which allows continuous magnetic field annealing of amorphous metal cores of the type used in electrical transformers.

For some time, it has been recognized that the magnetic core of an electrical transformer may be fabricated from coiled strips of a glass-like metal alloy having a random non-crystalline atomic structure. Such cores, which are commonly referred to as amorphous metal cores, have several advantages as compared to the standard metal cores. For example, a transformer with an amorphous metal core has a no load power loss which is substantially lower than that of a transformer with a standard metal core.

It is known in the art to anneal amorphous metal cores in a furnace under controlled heating and cooling cycles, while concurrently applying a magnetic field to the cores. The magnetic field is generated by passing direct electrical current through a conductor that is positioned in the central opening of the core, during the annealing process.

Present magnetic field annealing furnaces operate as batch processes. In the batch process, each core within a batch of cores is individually loaded onto specially designed carts that carry conductive magnetizing shafts that are vertically disposed. The cores are loaded horizontally so that the vertical shafts are passed through the central opening of each core. The shafts are series connected to a current source such that each core is subjected to its own magnetic field and the batch is placed into the furnace where the lengthy heating and cooling cycles begin. After the annealing is complete, the batch must be individually unloaded so a new batch can be annealed. As will be apparent, the batch process as described above is relatively slow and labor intensive.

A continuous process for magnetic field annealing has been proposed to increase production speed and reduce the required manual labor as for example, U.S. Pat. No. 4,649,248 to Yamaguchi et al. This patent discloses a process where each core is loaded onto a tray for transport through the furnace. As in the batch process, each tray holds the core in a horizontal position such that a conductive magnetizing shaft is vertically disposed in the central opening of the core while the magnetic field is being applied.

The problems with the conventional batch and continuous processes are severalfold. First, each core in the furnace is subjected to an individual magnetic field so that it is difficult to ensure statistical uniformity of material properties as amongst individual cores. Secondly, the cores are annealed in a non-optimal horizontal position with their central openings defining vertical axes. In the field, however, the transformers are oriented such that the cores hang in a vertical position with their central openings defining horizontal axes. It is preferable to anneal the cores in the same position relative to gravity as they are used in operation.

Still further, the Yamaguchi et al process requires multiple current sources, which increases the cost and complexity of the apparatus, and since the cores are annealed while lying on a tray, the heat transfer to the core is uneven. More particularly, heat transfer from the oven to the core occurs by conduction on the side of the core which is in contact with the tray and by convection on the side in contact with the atmosphere of the oven.

It is accordingly an object of the present invention to provide a method and apparatus for magnetic field annealing that allows the cores to be effectively and efficiently annealed in a continuous fashion.

It is another object of the present invention to provide a method and apparatus for magnetic field annealing that maintains the cores in a vertical position while the cores are heated and the magnetic field is being applied, and so as to facilitate the automation of the process.

It is still another object of the present invention to provide a method and apparatus for magnetic field annealing that subjects the individual cores to one common magnetic field during the entire continuous annealing process.

Additional objects of the present invention include the provision of a method and apparatus of the described type which requires only a single current source, and which provides rapid and uniform heat transfer to each core.

SUMMARY OF THE INVENTION

The above and other objects and advantages are achieved in the embodiment of the invention disclosed herein by the provision of a method and apparatus which includes an elongate furnace having a controlled heat source therein, and at least one electrically conductive rod extending longitudinally through said furnace. Means are provided for transporting the cores serially along the length of the rod and through the furnace, and with the cores being oriented so that the rod passes through the central openings of the cores. Also, a direct current power means is provided for conducting direct current through an electrical loop which includes the length of the rod and so as to generate an electromagnetic field along the length of the rod and while the cores are transported along the rod and through the furnace.

In the preferred embodiment, the direct current power means includes means for electrically gripping and supporting each of the ends of the rod while permitting the cores to pass along the entire length of the rod without interrupting the current flow. Also, the means for transporting the cores includes a guide track disposed along an endless path of travel and which includes a first portion which extends along the length of the furnace and parallel to and above the rod, and a plurality of hangers dependingly supported by the guide track. Each of the hangers includes a support member for supporting a core in an orientation wherein the central opening thereof faces horizontally. In addition means are provided for advancing the hangers along the guide track.

Also in the preferred embodiment, the furnace comprises two side by side heating chambers, with each chamber having a separate conductive rod extending along its length, and with the core transporting means having provision for transporting one half of the cores serially along the length of one of the rods and through one of the chambers, and for transporting the other half of the cores serially along the length of the other of the rods and through the other chamber. A separate heat source is provided in each chamber whereby a convective heating air flow is directed into contact with each of the cores. In this regard, each core is defined by parallel opposite side surfaces and outer peripheral surfaces, and these surfaces are substantially uncovered and directly exposed to the convective heating air flow so as to promote uniform heat transfer to the cores.

BRIEF DESCRIPTION OF THE DRAWINGS

Some of the objects and advantages of the present invention having been stated, others will appear as the description proceeds, when taken in connection with the accompanying drawings in which FIG. 1A is a partial plan view of the continuous field annealing apparatus of the present invention, illustrating the threading station and first portion of the furnace;

FIG. 1B is a partial plan view of the continuous field annealing apparatus of the present invention, illustrating the unthreading station and the last portion of the furnace;

FIG. 2 is a side elevation view of the initial portion of the furnace of the present invention, illustrating the threading station and the furnace entrance;

FIG. 3 is a sectioned end elevational view of the furnace of the present invention as viewed from the section line 3—3 shown in FIG. 2, illustrating schematically the flow path of heated air within the furnace;

FIG. 4 is a fragmentary and partially sectioned side elevational view of the guide track, power chain conveyor and core hangers of the present invention as viewed from the section line 4—4 shown in FIG. 1A, illustrating the direction of travel of the core hangers;

FIG. 5 is a fragmentary and partially sectioned top view of two of the load bars of the present invention as viewed from the section line 5—5 shown in FIG. 4, illustrating the position of the cores on the core hangers;

FIG. 6 is a fragmentary and partially sectioned front view of the trailing truck of a load bar of the present invention as viewed from the section line 6—6 shown in FIG. 4;

FIG. 7 is a fragmentary and partially sectioned front view of the leading truck of a load bar of the present invention as viewed from the section line 7—7 shown in FIG. 4, illustrating the pusher bar dog and the walking beam dog;

FIG. 8 is a fragmentary and partially sectioned side elevational view of the load bar and support member of the present invention as viewed from the section line 8—8 shown in FIG. 5, illustrating the position of the cores, the position of the conductive rod in the hangers when in the furnace and the direction of travel of the hangers;

FIG. 9 is a fragmentary and partially sectioned view of the load bar and support member of the present invention as viewed from the section line 9—9 shown in FIG. 5, illustrating the position of the cores and the conductive rod in the hangers when in the furnace;

FIG. 11 is a fragmentary and partially sectioned top view of the threading station and grippers of the present invention as viewed from the section line 11—11 shown in FIG. 10, illustrating the conductive rod being threaded into the cores as they enter the furnace;

FIG. 12 is a fragmentary and partially sectioned front view of one of the grippers of the present invention as viewed from the section line 12—12 shown in FIG. 11, illustrating the position of the conductive rod within the grippers;

FIG. 13 is a fragmentary and partially sectioned side view of one of the grippers of the present invention as viewed from the section line 13—13 shown in FIG. 11;

FIG. 14 is a fragmentary perspective view of the grippers and DC power supply of the present invention, illustrating the electrical circuit formed by the grippers and the conductive rod;

FIG. 16 is a fragmentary and partially sectioned view of the pusher bar of the present invention;

FIG. 17 is a fragmentary and partially sectioned view of the pusher bar of the present invention as viewed from the section line 17—17 in FIG. 16;

FIG. 18 is a fragmentary and partially sectioned view of the pusher bar of the present invention as viewed from the section line 18—18 in FIG. 16;

FIG. 19 is a fragmentary and partially sectioned view of the puller bar of the present invention;

FIG. 20 is a fragmentary view of the walking beam of the present invention.

DETAILED DESCRIPTION OF THE PREFERRED EMBODIMENTS

Figure 10:
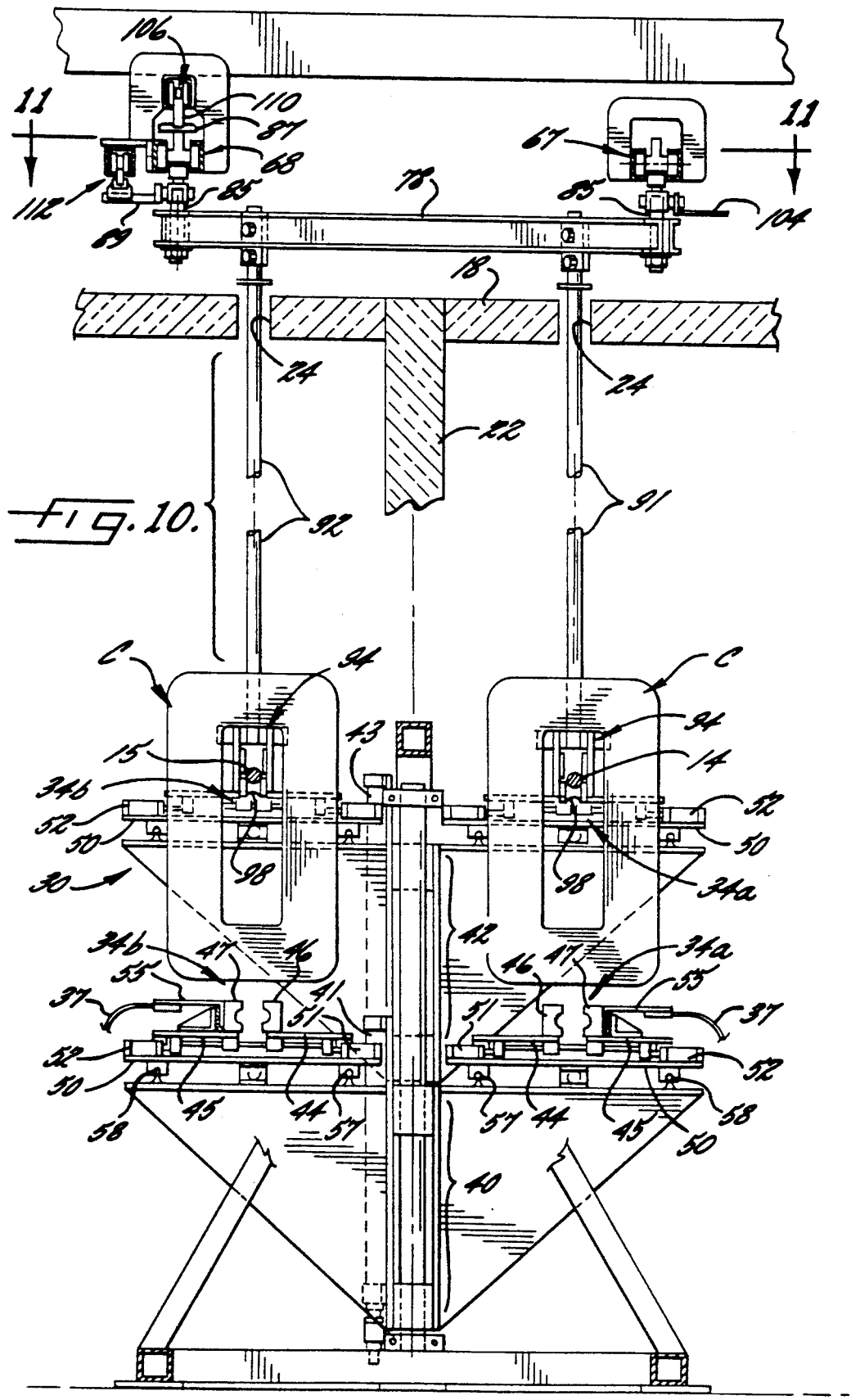
FIG. 10 is a fragmentary and partially sectioned front view of the threading station and grippers of the present invention as viewed from the section line 10—10 shown in FIG. 1A, illustrating the conductive rod being threaded into the cores as they enter the furnace.

In overview, and as best seen in FIGS. 1A and 1B, an apparatus which embodies the features of the present invention is indicated generally at 10. As will become apparent, the apparatus 10 is adapted for annealing magnetic cores C of the type comprising a closed loop of metallic material which defines a central opening, and wherein the cores may be continuously processed under conditions of controlled heat and while in a magnetic field.

In the illustrated embodiment, the apparatus 10 comprises an elongate furnace 12 having a controlled heat source therein, and the furnace 12 has a pair of electrically conductive rods 14, 15 extending longitudinally therethrough. The rods are laterally spaced apart and parallel to each other, and the rod 14 is herein identified as the right rod and rod 15 as the left rod. Also, means are provided for transporting the cores C serially along the length of each of said rods and through said furnace, and with the cores being oriented so that the rod passes through the central openings of the cores. In addition, the apparatus 10 includes direct current power supply 16 (FIG. 14) for conducting direct current through an electrical loop which includes the length of each of said rods 14, 15 and so as to generate an electromagnetic field along the length of each rod and while the cores are transported along said rods and through said furnace.

Referring now to the various components of the apparatus in more detail, the furnace 12 is best illustrated in FIGS. 1A, 1B, 2 and 3 and will be seen to comprise top and bottom insulating walls 18, 19, and opposite insulating sides 20, 21 to define a rectangular enclosure as best seen FIG. 3. Also, the enclosure is divided by a vertical insulating panel 22 to define two side by side heating and cooling chambers of like construction and which extend along the length of the furnace. As will become apparent, the presence of the two like chambers permits the apparatus to be selectively operated at maximum capacity with both chambers operative, or operated at a reduced capacity with only one of the chambers being operative.

A slot 24 is positioned in the top insulating wall 18 above each chamber to accommodate the hangers as further described below, and a door (not shown) is provided at each end of each chamber to allow the hangers to enter and exit the furnace with minimum heat loss.

Each chamber is divided into a series of six heating and cooling zones that are maintained at different temperatures to ensure proper annealing of the cores. The zones each have a fan 25 and a baffle 26 disposed between the fan and the cores to channel the air over the controlled heat source, which comprises an electrical heating element 28, and to uniformly heat the cores within that zone. The first two zones 12A, 12B are heating zones that provide enough heat to bring the cores up to a temperature of 350° C. The second two zones 12C, 12D are soak zones that maintain the cores at 350° C. for the time it takes for the hangers to travel through the zones. The fifth zone 12E is a slow cooling zone where a fan blows unheated air over the cores. The sixth zone 12F is a fast cooling zone and has two fans that blow unheated air over the cores.

The apparatus 10 further includes a threading station 30 at the left or entrance end of the furnace as seen in FIGS. 1A and 2, and an unthreading station 32 at the right or exit end of the furnace as seen in FIG. 1B. The pair of electrically conductive rods 14, 15, which are preferably fabricated of copper, are positioned so as to extend through respective ones of the chambers of the furnace, and the respective ends of each rod are located at the threading station and the unthreading station, and are respectively connected to one of a pair of DC power supplies 16. More particularly, and as schematically illustrated in FIG. 14, a first pair of longitudinally spaced apart grippers 34a is adapted to engage the forward end of the rod 14, and a like pair of longitudinally spaced apart grippers 34b is adapted to engage the forward end of the rod 15. Also, a second pair of longitudinally spaced apart grippers 35a is adapted to engage the other end of the rod 14, and a like pair of longitudinally spaced apart grippers 35b is adapted to engage the other end of the rod 15. The pairs of grippers 34a, 34b are located at the threading station 30 and the pairs of grippers 35a, 35b are located at the unthreading station 32. Each of the pairs of grippers 34a, 34b is connected to the positive terminal of the direct current power supply 16 via the flexible connectors 37, and each of the pairs of grippers 35a, 35b is connected to the negative terminal of the power supply 16 via the flexible connectors 38 and the connecting rod 39. Preferably, a separate power supply 16 is provided for each rod 14 and 15, which includes a separate connecting rod 39 which runs parallel to the rod 14 or 15 so as to form an electrical loop which generates an electromagnetic field through which the cores move during their transport through the furnace. The use of such separate power supplies permits the efficient separate use of the two side by side heating and cooling chambers of the furnace.

For the apparatus to function as a continuous process, the electrical circuit can not be broken at any time during the threading and unthreading of the cores onto and from the conductive rod, and it is therefore necessary that at least one of each pair of grippers associated with each rod be in contact with the rod as each core is threaded onto and from the rod. Thus the grippers of each pair are mounted so as to be sequentially released and withdrawn from the rod, and then reconnected to the rod, and so as to permit the cores to be threaded onto and from the rod. Moreover, it should be understood that the grippers physically support the conductive rods as the cores are threaded onto and from the rods, while simultaneously maintaining a continuous electrical connection with the rod.

The structure for effecting the sequential release and withdrawal of the grippers of each pair is illustrated in FIGS. 10-13 and 15A-15E. These figures illustrate the grippers at the threading station 30, and it will be understood that the grippers at the unthreading station operate in the same manner. As illustrated, the first or upstream gripper of the pair 34a and the first gripper of the pair 34b are mounted on a first gripper yoke 40 that is raised and lowered along vertical yoke slides by a hydraulic cylinder 41. The second or downstream gripper of the pair 34a and the second or downstream gripper of the pair 34b are mounted on a second gripper yoke 42 that is also raised and lowered along vertical yoke slides by a hydraulic cylinder 43.

As is best shown in FIGS. 12 and 13, each gripper includes a pair of gripping chucks 46, 47 which are mounted on a pair of laterally directed supporting slides 44, 45 and which are in turn slidably mounted on parallel shafts 48, 49. Each chuck 46, 47 includes a conducting face 46a, 47a, and each chuck is pushed and pulled along the two shafts by a hydraulic cylinder 51, 52. The chuck faces 46a, 47a firmly grip the conductive rod when the hydraulic cylinders push both chucks against the surface of the rod. The chuck faces are made of a conducting material and have a semicircular channel to fully engage the conductive rod when in the closed position. Electrically insulative material 54 separates each chuck from the supporting slide and an electrical lead 55 is interposed between the chuck 47 and the insulative material 54. The flexible connecting cables 37, 38 connect the leads 55 to the DC power supply 16. Therefore, current from the power supply flows only through the connecting cables 37, 38, leads 55, chuck faces 46a, 47a and conductive rod and not through the supporting slides 44, 45, and shafts 48, 49, etc. As best shown in FIGS. 12 and 13, the shafts 48, 49 are mounted on a supporting plate 50, which is slidably mounted on its gripper yoke by a pair of guide rods 57, 58 which are parallel to the conductive rod. The plate 50 is biased in both directions along the guide rods 57, 58 by springs 59 which prevent the chuck faces from stripping the rod by absorbing any longitudinal pulling forces in the rod. Also, the resulting "float" of the plate 50 accommodates any thermal expansion of the copper rod. The use of such guide rods 57, 58 and spring 59 is normally only required at one end of the rods.

As indicated above, the apparatus of the present invention also includes means for transporting the cores C serially along the length of each of the conductive rods and through the furnace. This transporting means includes a guide track 65 disposed along an endless path of travel and including a first portion 65a which extends along the length of the furnace 12 and parallel to and above the conductive rods 14, 15, and a second portion 65b which extends at a location spaced from the furnace and between the ends of the first portion. Also, the first portion 65a is composed of two parallel runs 67, 68, which extend through the threading station 30, the furnace 12, and the unthreading station 32. A first switching unit 70 (FIG. 1A) is positioned at the junction of the second track portion 65b and the two runs 67, 68 of the first track portion 65, and a second switching unit 72 (FIG. 1B) is positioned at the exit end of the junction of the two runs of the first track portion 65a and the second track portion 65b, to provide the function described below.

As best seen in FIG. 6, the guide track 65 is composed of two "C" shaped track rails 74, 75 placed in opposition to each other so that the their concave faces are adjacent each other but spaced apart. The rails 74, 75 are laterally spaced apart so as to define a vertical opening or slot 76 therebetween.

The transporting means further comprises a plurality of load bars 78, with each load bar 78 including a lead guide track assembly 80 and a trailing guide track assembly 81, with the guide track assemblies being supported from the guide track so as to support the load bar 78 in a generally horizontal orientation and for movement therealong. More particularly, and as best seen in FIG. 4, each guide track assembly 80, 81 comprises two sets of rollers 83, 84 which are positioned to ride along the rails 74, 75 of the guide track, and a depending pivot pin 85 which is pivotally attached to the associated end of the load bar and which extends downwardly through the slot 76 formed by the two rails 74, 75 of the guide track 65. A roller 77 is mounted on each pin 85 so as to engage the slot 76 and thus stabilize the assembly. Also, the lead guide assembly 80 mounts a catch 87 which is positioned above the guide track 65, and the trailing guide assembly 81 includes a latch slide 88 which is also located above the guide track. The lead guide assembly 80 also mounts a laterally directed dog 89 which is positioned below the guide track.

Each of the load bars 78 mounts a pair of spaced apart depending hangers 91, 92, and each of the hangers includes a horizontal support member 94 for supporting the cores C as the load bars are pulled along the guide track 65. The support members 94 can accommodate various sizes of cores and they include two forks 95, 96 that lie in a vertical plane that is inclined at an angle of about 30° from the vertical plane defined by the load bar 78 (See FIG. 5), so that the axes defined by the central openings of the cores are parallel to the associated conductive rods 14, 15 during threading onto the rod and movement through the furnace as shown in FIG. 11, and as further explained below. The hangers 91, 92 are bent in a manner that allows the cores to hang directly below the point where the hanger attaches to the load bar so that the cores are maintained in a vertical position.

Each support member 94 further includes a guide roller 98 which is attached to each hanger at a location below the forks 95, 96. Each roller 98 supports the conductive rod while the hanger moves through the furnace, and each roller 98 is connected to the base of the hanger so as to be supported between a pair of depending bars 100, 101. Each guide roller 98 is preferably fabricated from a non-conductive material, such as ceramic, so as to electrically insulate the guide roller 98 from the conductive rod. Also, the inside surfaces of the bars are covered by skid plates 102 which are made of an insulative material so that the conductive rod is held out of electrical contact with the hanger. As further described below, the conductive rod is threaded onto the guide roller 98 as each hanger enters the furnace at the threading station 30, and the conductive rod rests on the guide roller 98 as the hanger travels the length of the furnace. Since many hangers are in the furnace at all times, the rod is thus fully supported along its length. The cores are unthreaded from the conductive rod as the hanger exits the furnace at the unthreading station 32.

Pivotable, counterweighted anti-backup latches 103, as seen in FIG. 11 are preferably positioned at various points along the guide track 65 to engage behind the rollers 77 and thus ensure that the load bars always travel forwardly along the guide track. Also, and as shown in FIG. 6, a proximity switch target 104 is located on the trailing track assembly of each load bar which triggers proximity switches 105 at various points along the guide track as further described below. The various hydraulic cylinders and solenoids of the present invention are activated in the proper sequence via a programmable logic controller that integrates all these components and renders the apparatus fully automatic.

The transporting means of the apparatus further comprises means for advancing the load bars along the guide track, and such that the pair of guide track assemblies 80, 81 of each load bar are supported by respective ones of the two runs 67, 68 of the first portion of the guide track, and such that the two cores which are supported by the pair of hangers 91, 92 of each load bar are threaded onto respective ones of the rods. The means for advancing the load bars includes an endless power chain conveyor 106 which is located directly above the second portion 65b of the guide track and which is external to the furnace. As seen in FIGS. 1A, 1B, 15A, and 15F, the power chain conveyor 106 rises above the run 68 of the guide track at the entrance to the furnace, it then moves along a serpentine path exterior to the furnace entrance (FIG. 1A), and it then returns to a position immediately above the run 68 adjacent to the exit end of the furnace.

As shown in FIG. 4, the power chain conveyor 106 includes a supporting track 107 and a chain 108 and rollers 109 that are disposed at spaced apart locations along the chain to keep the chain separated from the track surface. Power chain latches 110 are disposed at spaced apart locations along the chain and extend below the power chain track to engage the catches 87 on the lead track assemblies 80 as further described below.

The load bars 78 are moved through the threading station 30 by a pusher bar assembly 112 as is best seen in FIGS. 1A, 15A–15D, and 16-18. The pusher bar assembly 112 has a latch bar 114 that is moved by a hydraulic cylinder 115 along a pusher bar track 116 positioned below the power chain conveyor 106 and adjacent to the run 68 as can be seen in FIG. 10. As is best shown in FIGS. 16-18, the latch bar 114 has vertical and horizontal wheels 118, 119 that align the bar 114 within the track 116. Extending through the gap at the base of the track is a latch 121 that engages dogs 89 which are mounted on the leading guide track assemblies.

After entering the furnace 12, each load bar 78 is engaged by a walking beam assembly 124 that pulls all of the load bars through the length of the furnace. As is best shown in FIG. 20, the walking beam assembly 124 has a series of connected links 125 that are disposed along the length of the furnace and within a conveyor track 127. A series of latches 126 extend downwardly from the links and engage the catches 87 that are located on top of the lead guide track assemblies as shown in FIGS. 15E and 15F. The walking beam assembly is attached to a hydraulic cylinder 128 that moves it forward and back in an indexing motion to repeatedly engage and disengage each load bar, thereby walking it through the furnace.

The load bars are moved through the unthreading station 32 by a puller bar assembly 130 as best seen in FIGS. 1B, 15F and 19. The puller bar assembly 130 is of a construction generally conforming to that of the pusher bar assembly as described above, but in a mirror image relationship. In FIG. 19, the corresponding elements are designated by the same reference numerals but with a prime notation.

The operation of the apparatus will now be described. In this regard, the cores are loaded onto the hangers 91, 92 of each load bar 78 at a load station as shown in FIG. 1A. The power chain conveyor 106, which moves continuously and is located directly above the second portion of the guide track, pulls the leading load bar from the load station toward the threading station, by engaging the catch 87 of the leading load bar.

As the load bars are pulled toward the threading station, the first switching unit 70 directs the leading and trailing guide track assemblies onto the left and right track runs 68, 67 respectively. The power chain conveyor is located above the left track run 68 and continues to pull the lead track assembly as the trailing track assembly follows on the right track run. The track runs are spaced apart so that each load bar 78 is oriented at about a 60° angle with respect to the runs, and the cores face parallel to the entrance of the furnace. The load bars travel at this angle through the furnace until the load bars are merged back onto a single track at the second mechanical switching unit 72 at the opposite end of the furnace.

Figure 15A:
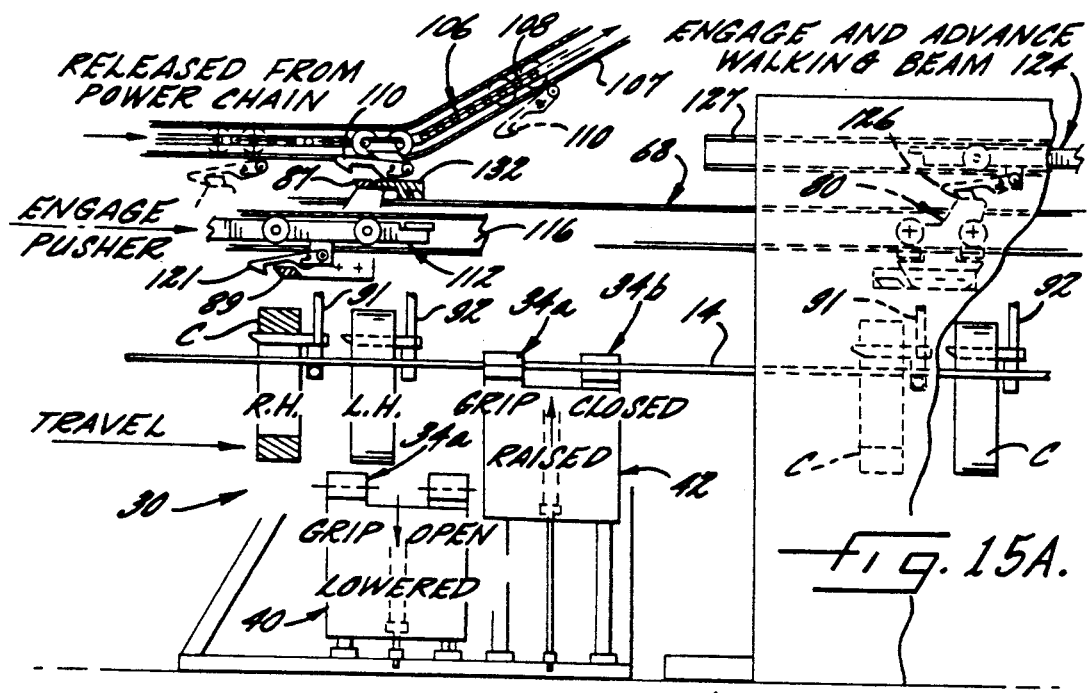
FIGS. 15A–15E are fragmentary and partially sectioned views of the threading station of the present invention, illustrating the operation of the power chain conveyor, the pusher bar, the first and second pairs of grippers and the walking beam.
Figure 15B:
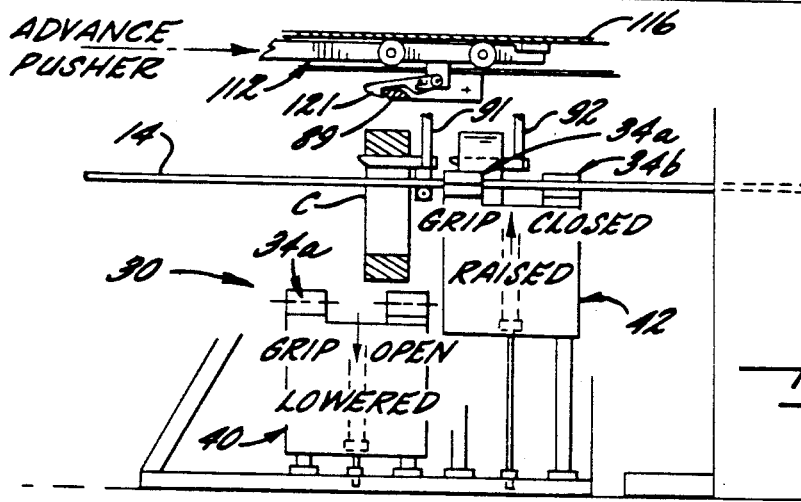
Figure 15C:
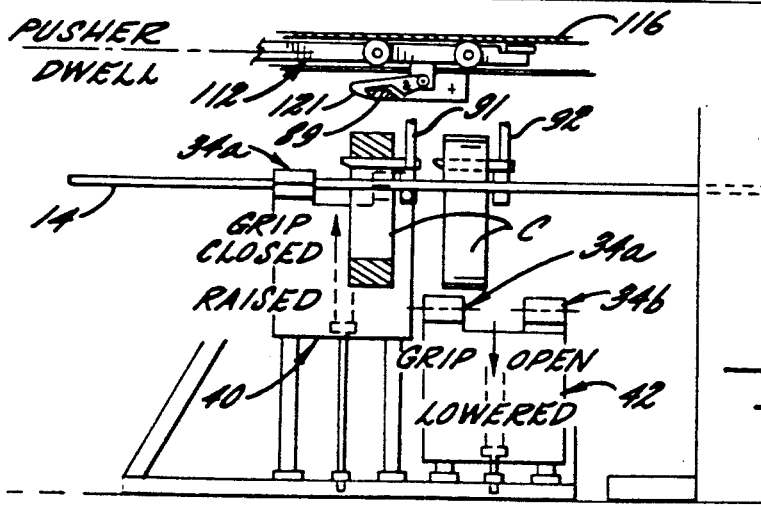
Figure 15D:
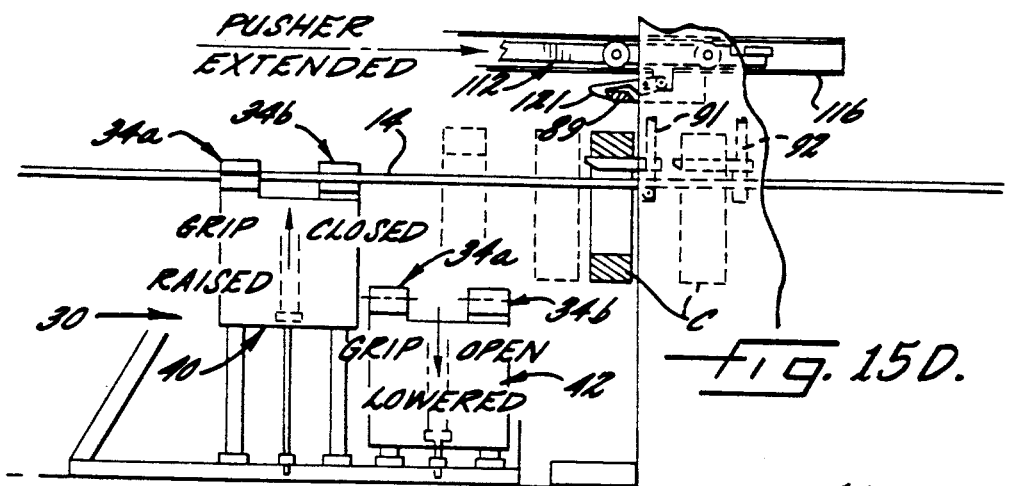
Figure 15E:
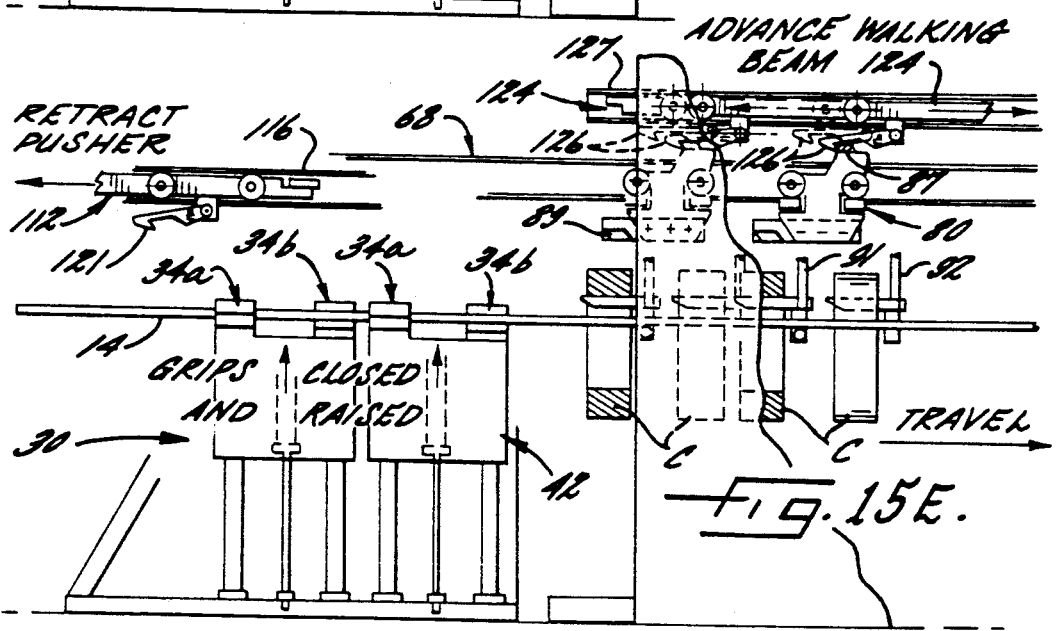
Figure 15F:
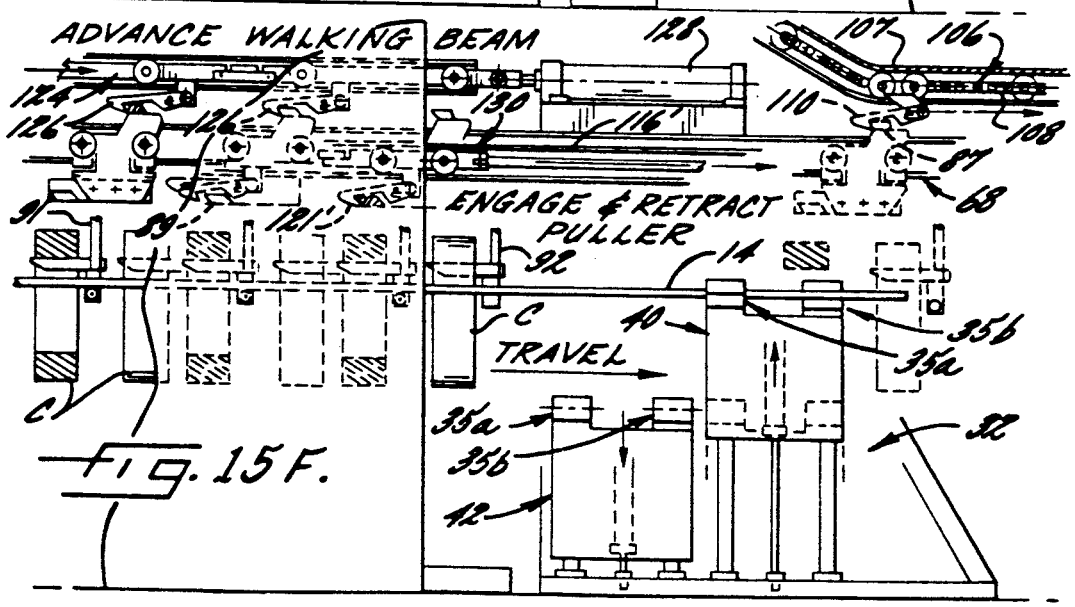
FIG. 15F is a fragmentary and partially sectioned view of the unthreading station of the present invention, illustrating the operation of the walking beam, the puller bar, the first and second pairs of grippers and the power chain conveyor.

As is best shown in FIGS. 11 and 15A, the pusher bar engages the dog 89 of the lead guide track assembly on the left track run when the load bar is pulled by the power chain conveyor into the position at stop #1, or the threading station 30. To disengage the power chain conveyor at this point, a latch trip 132 is activated by a solenoid and moves from a position adjacent to the track run to a position directly above the track run and in front of the catch 87. The latch trip disengages the latch 110 of the power chain conveyor in a manner similar to the operation of the latch slide 88 on the trailing guide track assembly as more fully described below. The power chain conveyor track is directed up and away from the guide track and continues away from the furnace. The power chain track directs the power chain through a chain drive and tensioner 133 (FIGS. 1A and 2) and returns it to the furnace exit to engage the load bars as they leave the unthreading station as more fully described below.

In addition, the cores are threaded onto the stationary conductive rods 14, 15 which are supported by the guide rollers 98 of the hangers. As best seen in FIGS. 15A-15E, all of the cores are moved one position forward by the walking beam assembly 124. During the cycling of the walking beam assembly 124, all of the pairs of grippers 34a, 34b, 35a, and 35b are in the raised position and their grippers are closed to grip the rods 14, 15. The first or upstream gripping chucks 46, 47 of the pairs 34a, 34b will then open to release from the rods and the first gripper yoke 40 is lowered to allow the cores to pass over it. When the load bar has reached an intermediate position between the first yoke and the second yoke, the first yoke 40 is raised and its gripping chucks of the pairs 34a, 34b are closed to grip the conductive rods. The second or downstream gripping chucks of pairs 34a, 34b then open to release the conductive rods and the second yoke 42 is lowered. Then the two pneumatically operated entrance doors (not shown) open and the load bar is pushed into the furnace by the pusher bar assembly. The load bar is released after it has passed through the threading station and entered the furnace by retracting the hydraulic cylinder 115 which disengages the pusher latch 121 from the dog 89. As best seen in FIGS. 8 and 9, each core C defines opposite side surfaces S and outer peripheral surfaces P, and during their transport along the associated rod 14, 15 and through the furnace, the opposite side surfaces S and the outer peripheral surfaces P of each core are substantially uncovered and directly exposed to the convective heating air flow, note also FIG. 3. This uniform exposure to the convective heating air flow promotes uniform heat transfer to the cores. After the load bars have been pulled through the furnace by the walking beam, as more fully described above, it releases them and each is picked up by a puller bar assembly that latches onto the dogs 89. The puller bar assembly pulls the last load bar from the furnace and through the unthreading station 32 which has two pairs of grippers 35a, 35b which function to permit the unthreading of the cores from the rods in the same manner as the threading station. The flexible connecting cables 38 at the unthreading station, however, are not connected directly to the DC power supply but to the second conductive rod 39 as shown in FIG. 14. The power chain conveyor is directed down from above the furnace and the power chain re-engages the lead guide track assembly as it is released from the puller bar as shown in FIG. 15F.

The leading track assemblies so are pulled through the second switching unit 72 by the power chain conveyor where they are merged back onto the single track. The load bars continue along the guide track through various work stations with the movement of the load bars being controlled by the proximity switches 105 which detect the targets 104 (FIG. 6) of the lead guide track assemblies 80, and which operate in conjunction with the stops 132 in accordance with a predetermined program.

During movement of the load bars along the second portion 65b of the guide track 65, other processing operations can be preformed on the cores, such as, for example, edge bonding where the thin edges of metal that comprise the core are coated with an adhesive to maintain the integrity of the stack and hold any loose chips of the brittle amorphous metal. The edge bonding adhesive may for example comprise the nitrile phenolic adhesive sold by the 3M Company as Adhesive 826. Such edge bonding techniques are known per se. The cores are then unloaded at an unload station. The load bars with empty hangers then accumulate along an empty portion of the guide track before they are reloaded at the load station and begin the cycle again.

In situations where free or unlatched load bars accumulate, such as, for example, the accumulation station seen in FIG. 1A, it is desirable that only the first of the accumulated load bars be pulled by a power chain latch 110. This ensures that the load bars are properly spaced along the track. For this purpose, the power chain latch slide 88 located on top of the upper portion of the trailing track assembly 81 (note FIG. 4) and the front cam surfaces of the pivotally mounted latches 110 ensure that only the leading track assembly is engaged. As a latch 110 approaches the accumulation of load bars, its cam surface contacts the trailing edge of the trailing track latch slide 88 of the last load bar. The latch 110 is thus rotated upwardly toward the edge of the power chain track and it passes over the guide track assembly 81 without engaging it. As the latch 110 approaches the point where the leading guide track assembly so abuts the trailing guide track assembly 81 of the load bar immediately in front of it, the latch 110 is once again rotated into a non-engaging position by the trailing edge of the leading track assembly catch 87 and it stays in this position until it has traveled along the length of the trailing track assembly latch slide 88, thereby failing again to engage the track assembly. When the latch 110 reaches the catch 87 of the lead guide track assembly of the leading load bar, however, it is only kept in the non-engaging position until the cam surface has passed over the leading edge of the catch 87 whereby the latch rotates back into the engaging position and engages the catch. Thus, only the first of an accumulation of load bars is pulled by the power chain conveyor.

In the drawings and specification, there has been set forth a preferred embodiment of the invention, and although specific terms are employed, they are used in a generic and descriptive sense only and not for purposes of limitation.

That which is claimed is:

1. A method for annealing magnetic cores of the type comprising a closed loop of metallic material which defines a central opening, and comprising the steps of
    transporting the cores serially along the length of an electrically conductive rod, and with the cores being oriented so that the rod passes through the central openings of the cores, while
    heating the cores, and while
    causing a direct electrical current to flow through an electrical loop which includes the length of said rod and so as to generate an electromagnetic field along the length of said rod, and such that the cores pass through said field.

2. The method as defined in claim 1 wherein the cores comprise an amorphous metal.

3. The method as defined in claim 2 wherein the step of transporting the cores includes supporting the cores so that the cores are spaced from the rod.

4. The method as defined in claim 3 wherein the step of causing a direct electrical current to flow through an electrical loop includes contacting each of the ends of the rod with a pair of releasable first and second longitudinally spaced apart grippers, with one or both of said first and second grippers of each pair being in electrical contact with said rod at all times, and with said pairs of grippers being in electrical contact with respective terminals of a direct current power supply.

5. The method as defined in claim 4 wherein the step of transporting the cores includes, at each end of the rod, the sequential steps of
    (a) releasing and withdrawing the first gripper of the associated pair from the rod,
    (b) advancing a core longitudinally along the rod past the first gripper and to an intermediate position upstream of the second gripper,
    (c) moving the first gripper so as to again electrically contact the rod and then releasing and withdrawing the second gripper from the rod,
    (d) advancing the core from its intermediate position longitudinally past the second gripper, and
    (e) moving the second gripper so as to again electrically contact the rod.

6. The method as defined in claim 5 wherein the step of transporting the cores further includes supporting each of the cores from a depending hanger, and advancing the depending hangers along a longitudinal direction parallel to the rod, and with each of the hangers physically engaging and supporting the rod.

7. The method as defined in claim 1 wherein said heating step includes directing a convective heating air flow into contact with each of said cores.

8. The method as defined in claim 7 wherein said cores each define opposite side surfaces and outer peripheral surfaces, and wherein the step of transporting the cores along the rod includes supporting each of the cores from a depending hanger which has a horizontal support member which extends into the central opening of the core and such that the central opening faces horizontally and the opposite side surfaces and the outer peripheral surface of each core are substantially uncovered and directly exposed to said convective heating air flow and so as to promote uniform heat transfer to the cores.

9. The method as defined in claim 8 comprising the further subsequent step of applying an edge bonding adhesive to at least said opposite side surfaces of said cores while the cores are supported on a depending hanger.

10. The method as defined in claim 1 wherein said electrically conductive rod is stationary.

11. The method as defined in claim 10 wherein the step of causing a direct electrical current to flow through an electrical loop includes providing a power supply which is electrically connected to said rod, with the power supply being stationary so that the cores move along said rod relative to the power supply.

12. An apparatus for annealing magnetic cores of the type comprising a closed loop of metallic material which defines a central opening, and wherein the cores may be continuously processed under conditions of controlled heat and while in a magnetic field, and comprising
    an elongate furnace having a controlled heat source therein, and at least one electrically conductive rod extending longitudinally through said furnace,
    means for transporting the cores serially along the length of said rod and through said furnace, and with the cores being oriented so that said rod passes through the central openings of the cores, and
    direct current power means for conducting direct current through an electrical loop which includes the length of said rod and so as to generate an electromagnetic field along the length of said rod and while the cores are transported along said rod and through said furnace.

13. The apparatus as defined in claim 12 wherein said direct current power means includes means for electrically gripping and supporting each of the ends of the rod while permitting the cores to pass along the entire length of the rod.

14. The apparatus as defined in claim 13 wherein said direct current power means further includes a direct current power supply having a pair of terminals of opposite polarity, and said means for electrically gripping and supporting each of the ends of the rod comprises a pair of releasable first and second longitudinally spaced apart grippers positioned adjacent each of the ends of the rod, with the grippers of one of said pairs being connected to one of said terminals and with the grippers of the other pair being connected to the other of said terminals, and control means for sequentially releasing and withdrawing the first and second grippers of each pair from the rod so as to permit a core to advance along the rod and past the grippers while maintaining continuous electrical contact with the rod.

15. The apparatus as defined in claim 12 wherein said means for transporting the cores comprises
   guide track means disposed along an endless path of travel and including a first portion thereof which extends along the length of said furnace and parallel to and above said rod,
   a plurality of hangers dependingly supported by said guide track means, with each of said hangers including a support member for supporting a core in an orientation wherein the central opening thereof faces horizontally, and
   means for advancing said hangers along said guide track means.

16. The apparatus as defined in claim 15 wherein said guide track means includes a second portion at a location spaced from said furnace, and wherein said means for advancing said hangers along said guide track means includes power chain conveyor means extending along said second portion of said guide track means for sequentially advancing each of said hangers therealong.

17. The apparatus as defined in claim 16 wherein said means for advancing said hangers along said guide track means further includes walking beam section means for sequentially advancing in unison all of the hangers which are located in said furnace along said guide track means.

18. The apparatus as defined in claim 15 wherein each of said hangers includes guide roller means for engaging and supporting the rod during the movement of the hanger through said furnace.

19. The apparatus as defined in claim 12 wherein said controlled heat source of said furnace includes means for directing a convective heating air flow into contact with each of said cores.

20. The apparatus as defined in claim 19 wherein said cores each define opposite side surfaces and outer peripheral surfaces, and wherein said means for transporting the cores includes hanger means for supporting the cores so that the central openings face horizontally and such that the opposite side surfaces and the outer peripheral surfaces of each case are substantially uncovered and directly exposed to said convective heating air flow.

21. The apparatus as defined in claim 20 wherein said hanger means includes guide roller means for engaging and supporting said one rod and such that said one rod remains stationary.

22. An apparatus for annealing magnetic cores of the type comprising a closed loop of metallic material which defines a central opening, and wherein the cores may be continuously processed under conditions of controlled heat and while in a magnetic field, and comprising
   an elongate furnace having a controlled heat source therein,
   a pair of electrically conductive rods extending longitudinally through said furnace, with said rods being laterally spaced apart and parallel to each other,
   means for transporting one half of the cores serially along the length of one of said rods and through said furnace, and transporting the other half of the cores serially along the length of the other of said rods and through said furnace, and with the cores being oriented so that the central openings of the cores are threaded by the respective rod, and
   direct current power means for conducting direct current through a pair of closed electrical loops which respectively include the length of one of said rods and so as to generate an electromagnetic field along the length of each of said rods and while the cores are transported along said rods and through said furnace.

23. The apparatus as defined in claim 22 wherein said transporting means comprises
   guide track means disposed along an endless path of travel and including a first portion which extends along the length of said furnace and parallel to and above said pair of rods, and a second portion which extends at a location spaced from said furnace and between the ends of said first portion, and with said first portion being composed of two parallel runs,
   a plurality of load bars, with each load bar including a pair of spaced apart guide track assemblies, with said guide track assemblies being supported from said guide track means so as to support the load bar in a generally horizontal orientation and for movement therealong, with each of said load bars mounting a pair of spaced apart depending hangers, with each hanger including a support member for supporting a core in an orientation wherein the central opening thereof faces horizontally, and
   means for advancing said load bars along said guide track means, and such that the pair of guide roller assemblies of each load bar are supported by respective ones of the two runs of said first portion of said guide track means, and such that the two cores which are supported by the pair of hangers of each load bar are oriented so that said rods pass through respective ones of the central openings of the cores.

24. The apparatus as defined in claim 23 wherein said direct current power means includes means for electrically gripping and supporting each of the ends of each of said rods while permitting the cores to pass along the entire length of each rod.

25. The apparatus as defined in claim 24 wherein each of said hangers includes guide roller means for engaging and supporting the associated rod during the movement of the hanger through said furnace.

* * * * *